United States Patent
Rodriguez et al.

(10) Patent No.: US 10,924,598 B1
(45) Date of Patent: Feb. 16, 2021

(54) STAND FOR DESKTOP PHONE

(71) Applicant: Plantronics, Inc., Santa Cruz, CA (US)

(72) Inventors: Hector Rodriguez, Austin, TX (US); Anthony Martin Duys, Merrimac, MA (US); Nathan Yang, Austin, TX (US); Gabriela Vargas, Austin, TX (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/543,299

(22) Filed: Aug. 16, 2019

(51) Int. Cl.
*H04M 1/11* (2006.01)

(52) U.S. Cl.
CPC .................................. *H04M 1/11* (2013.01)

(58) Field of Classification Search
None
See application file for complete search history.

(56) References Cited

U.S. PATENT DOCUMENTS

| | | | | |
|---|---|---|---|---|
| 5,394,468 A * | 2/1995 | Wood | ...................... | H04M 1/11 379/453 |
| 6,005,767 A * | 12/1999 | Ku | .......................... | G06F 1/162 345/169 |
| 6,266,236 B1 * | 7/2001 | Ku | .......................... | G06F 1/162 312/223.1 |
| 7,104,516 B2 * | 9/2006 | Uto | ........................ | F16M 11/10 248/456 |
| 7,564,679 B2 * | 7/2009 | Chen | ..................... | G06F 1/1601 248/917 |
| 2004/0233623 A1 * | 11/2004 | Hillman | ............. | F16M 11/2014 361/679.06 |
| 2007/0181755 A1 * | 8/2007 | Oh | ......................... | F16M 11/10 248/176.1 |
| 2015/0180524 A1 * | 6/2015 | Lambert | ............... | G06F 1/1632 455/575.1 |
| 2019/0145444 A1 * | 5/2019 | Lien | ........................ | H04M 1/11 24/490 |

* cited by examiner

*Primary Examiner* — Tuan D Nguyen
(74) *Attorney, Agent, or Firm* — Keith Lutsch, PC.

(57) ABSTRACT

A stand includes a neck, a base coupled to a first end of the neck, and a receiving interface located at a second end of the neck. The receiving interface is configured to receive a short stand of a desktop phone device.

20 Claims, 8 Drawing Sheets

STAND FOR DESKTOP PHONE

TECHNICAL FIELD

This disclosure relates to desktop phones.

BACKGROUND

Desktop phone devices are used in teleconferencing systems. Such phone devices often include a camera configured to record an image of a local participant and a screen to display an image of a remote participant. Unfortunately, the camera may generate images that poorly display the local participant due to a location of the camera on the desktop phone device. For example, the local participant may be poorly framed in an image generated by the camera located on the desktop phone device. Similarly, the screen may be inconvenient to view for the local participant due to a location of the screen on the desktop phone device. To illustrate, the local participant seated or standing at a desk may be required to look downward to view the screen on the desktop phone device. As a result, the local participant may develop neck soreness while viewing the screen for an extended period of time. In addition, images of the local participant generated by the camera located on the desktop as the local participant looks down toward the desktop may be unflattering and may not capture the local participant's face.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

Figure 1:
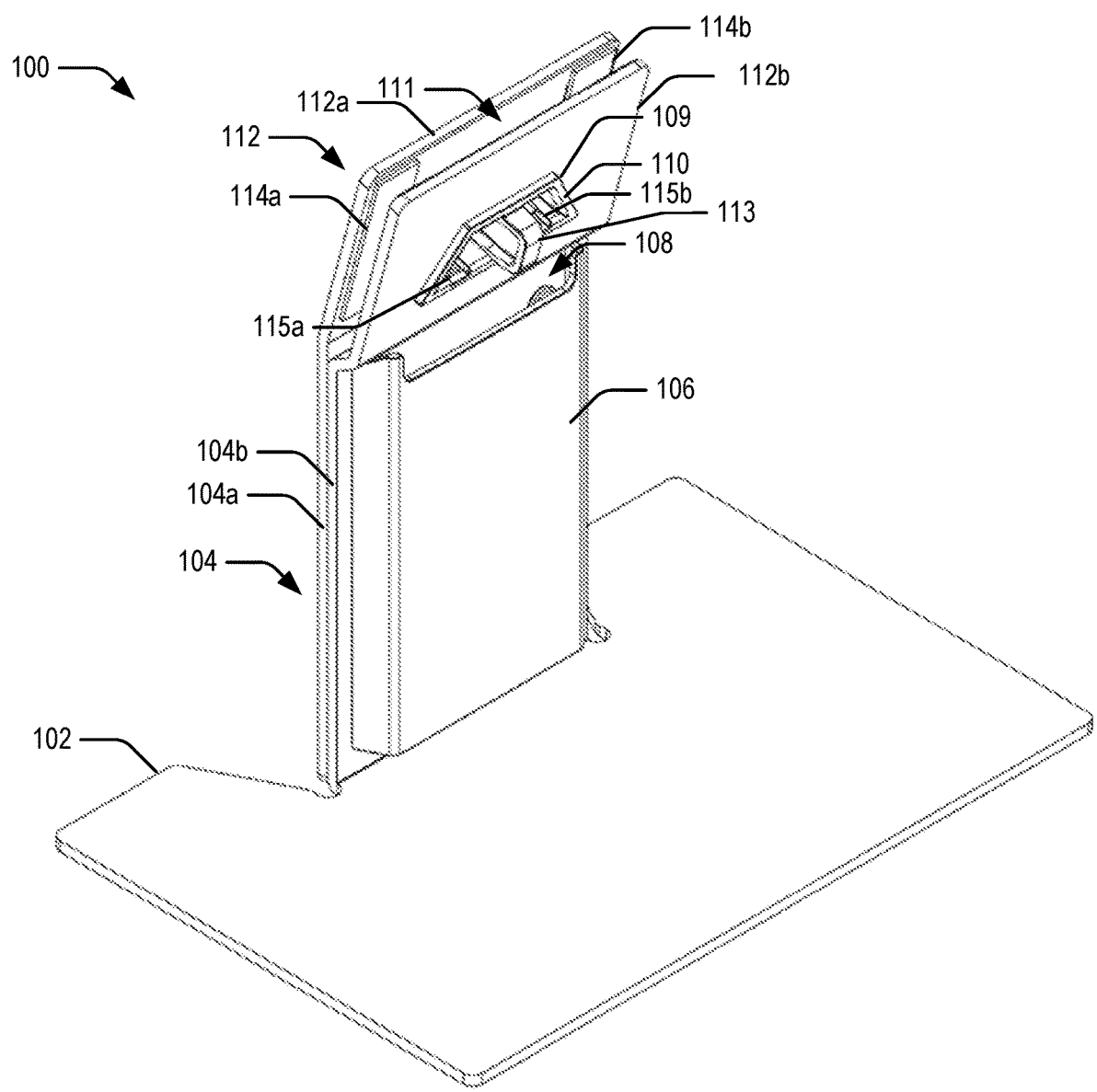
FIG. 1 illustrates a tall stand for a desktop phone device.
Figure 2:
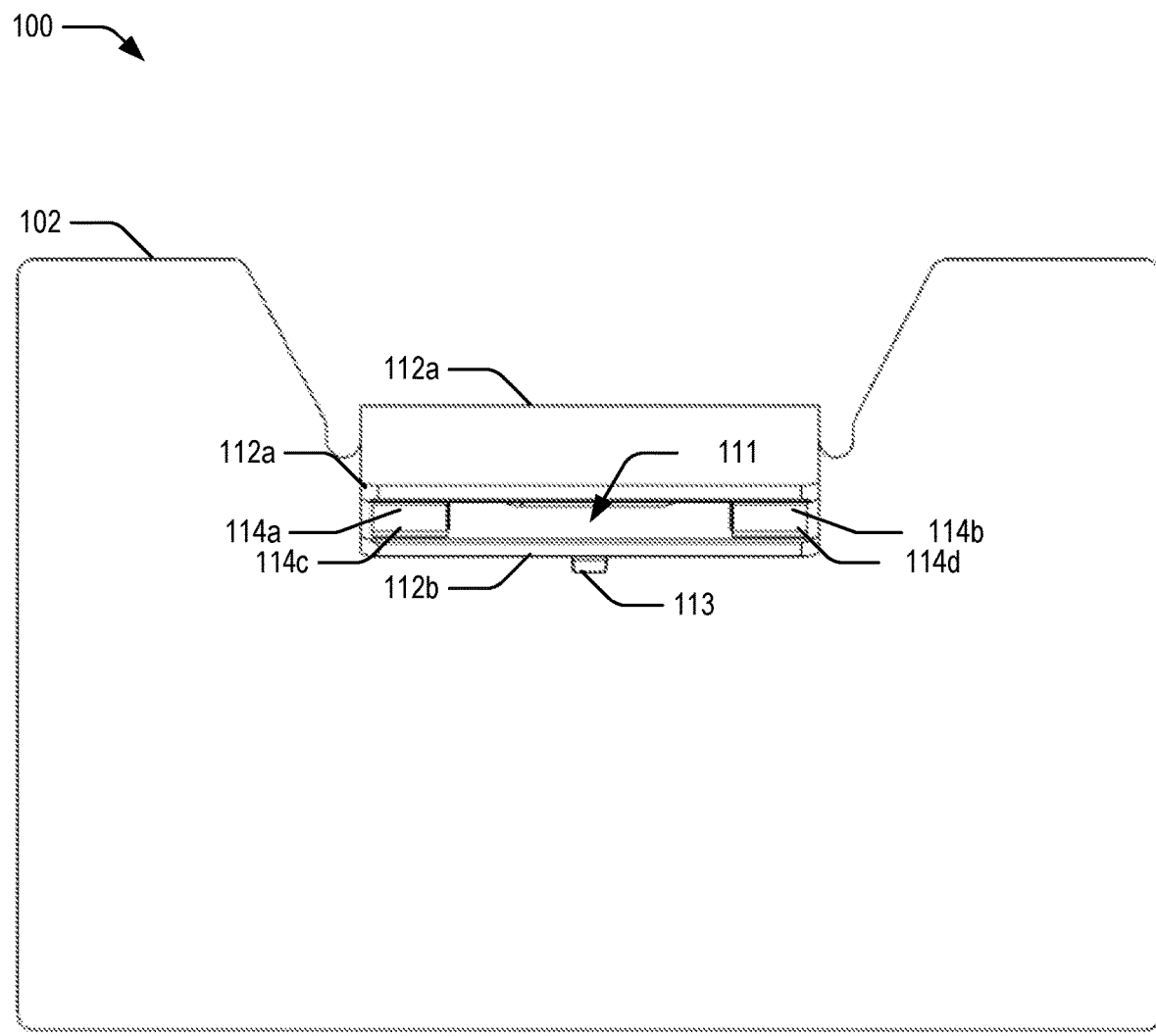
FIG. 2 illustrates a top-down view of the tall stand.

In the drawings and the description of the drawings herein, certain terminology is used for convenience only and is not to be taken as limiting the embodiments of the present disclosure. In the drawings and the description below, like numerals indicate like elements throughout.

Figure 6:
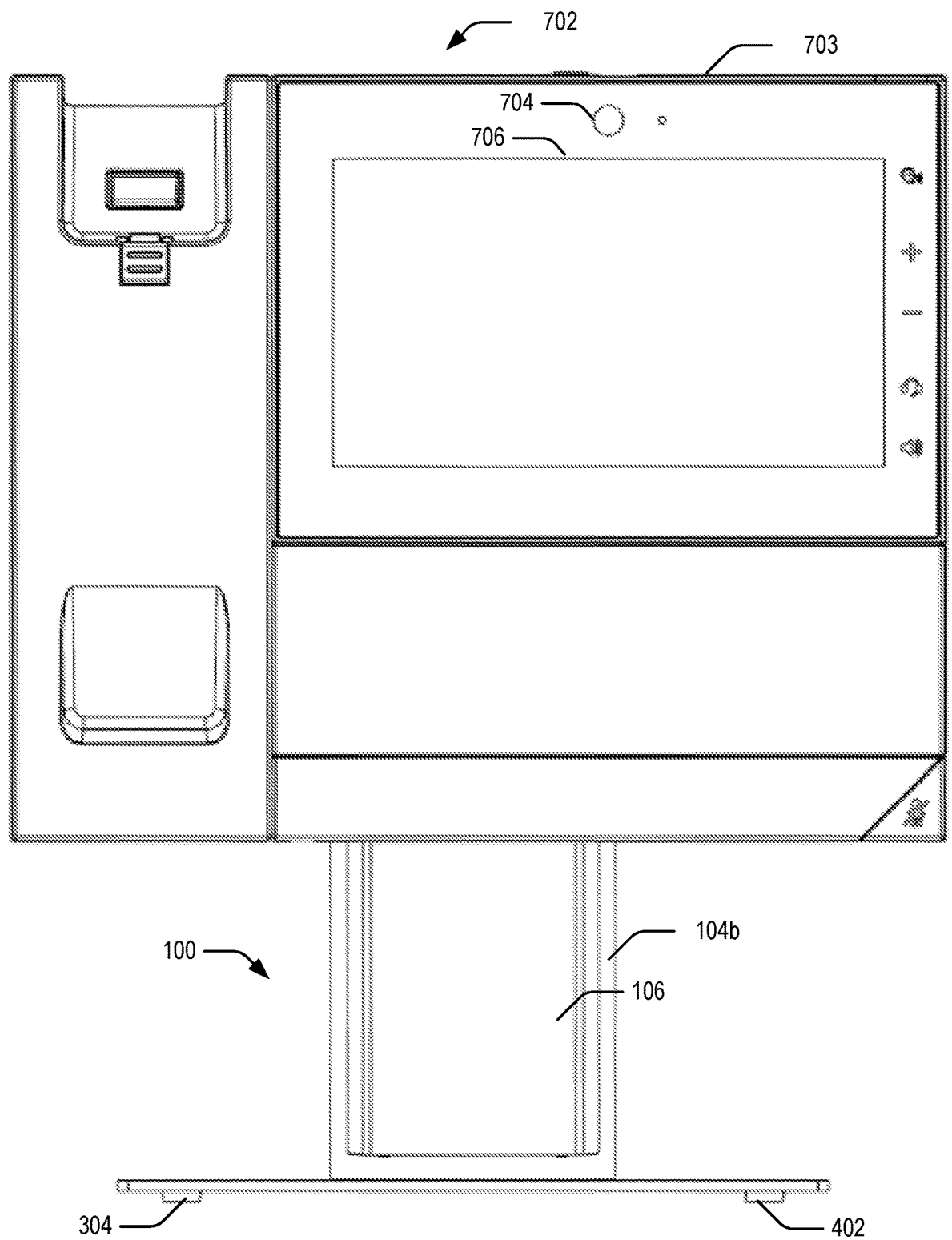
FIG. 6 illustrates a desktop phone device docked with the tall stand.
Figure 7:
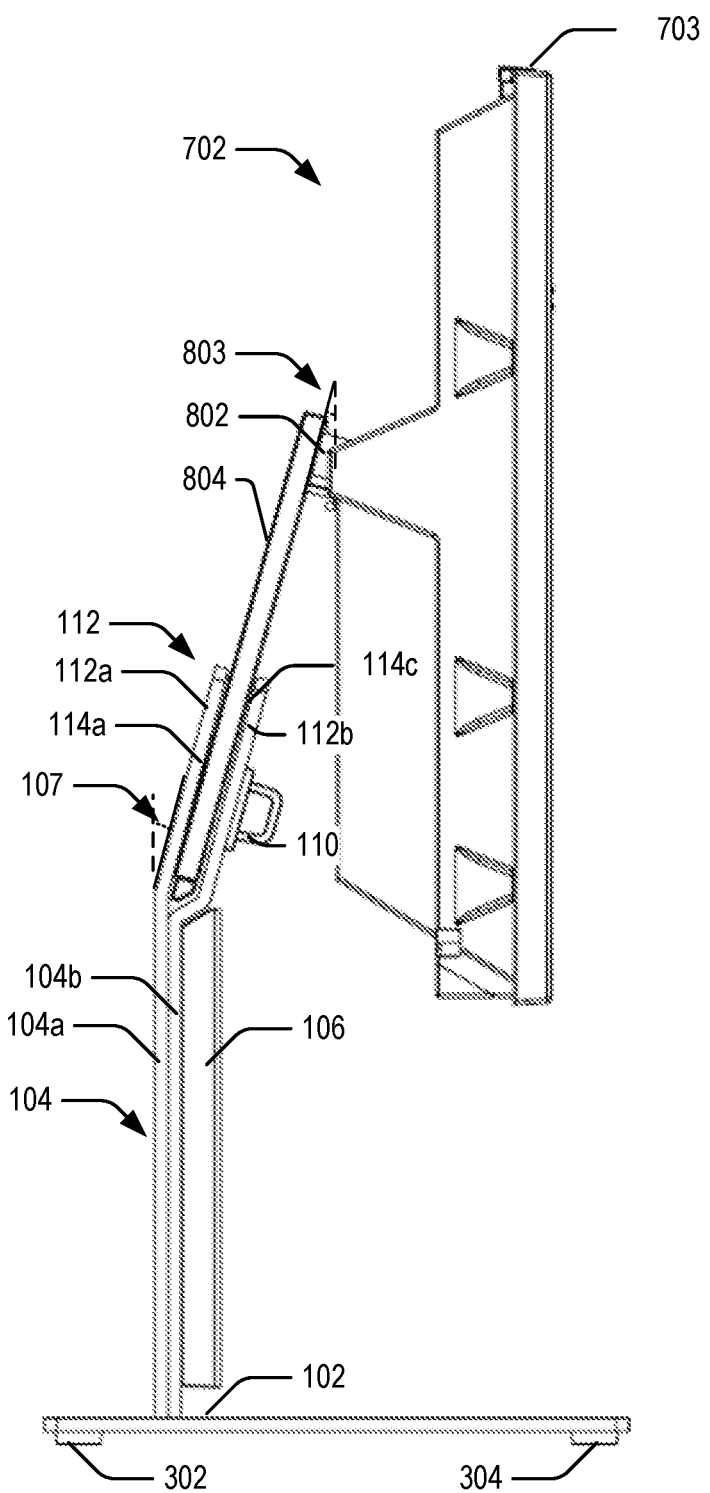
FIG. 7 illustrates a profile view of the desktop phone device docked with the tall stand.
Figure 8:
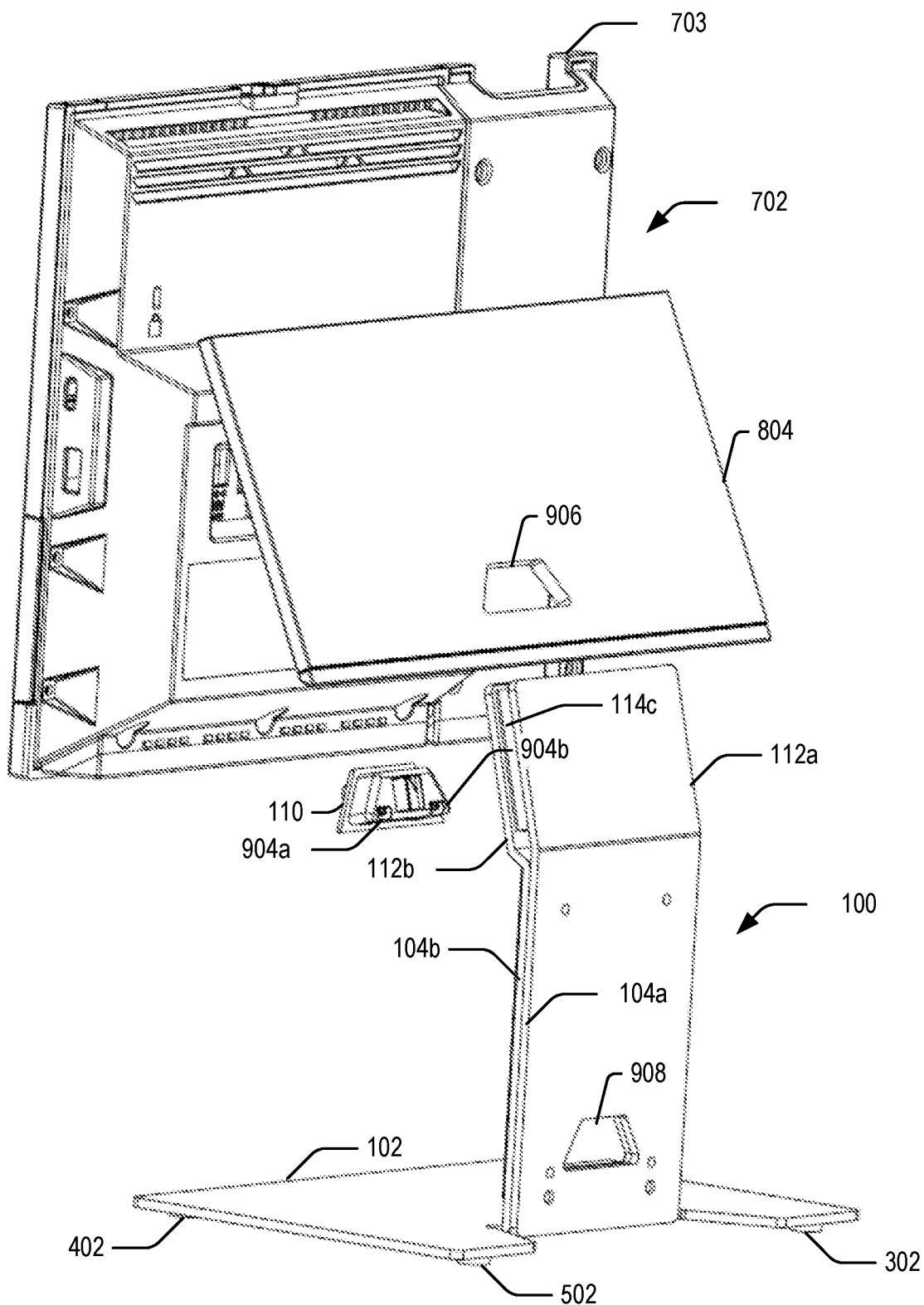
FIG. 8 illustrates a rear perspective view of the tall stand and the desktop phone device.

FIGS. 1-5 are various views depicting a tall stand 100 for a desktop phone device 702 (FIG. 6-8). The tall stand 100 includes a base 102 and a neck 104, and a receiving interface 112. The base 102, the neck 104, and the receiving interface 112 may include metal, plastic, etc. The neck 104 is coupled to a first end of the base 102 and the receiving interface 112 is located at a second end of the neck 104. In the illustrated example, the neck 104 and the receiving interface 112 are formed of common components. To illustrate, the neck 104 includes a first piece 104*a* that forms a first panel 112*a* of the receiving interface 112. The neck 104 further includes a second piece 104*b* that forms a second panel 112*b* of the receiving interface 112. Bends in the pieces 104*a*, 104*b* cause the first panel 112*a* and the second panel 112*b* to be spaced apart forming a slot 111. The receiving interface 112 and the slot 111 are angled with respect to the neck 104. In the illustrated example, the receiving interface 112 is positioned at an angle 107 with respect to the neck 104.

The receiving interface 112 is configured to receive a short stand 804 (e.g., short relative to the tall stand 100) of a desktop phone device 702 in the slot 111 as is described further below. The slot 111 preferably has a shape that is complementary to the short stand 804 of the desktop phone device 702 as described further below. The first panel 112*a* and or the second panel 112*b* may be flexible or configured to flex apart from each other and spaced such that a short stand 804 received in the slot 111 flexes the panels 112*a*, 112*b* and a spring force of the panels maintains the short stand 804 in the slot 111. The receiving interface 112 includes one or more shield pieces located on inner walls of the slot 111 and placed to protect the short stand 804 of the desktop phone device 702 from scratches caused by sliding the short stand 804 within the slot 111. The shield pieces may include panels that comprise plastic, rubber, etc., or a combination thereof. In the illustrated example, a first shield piece 114*a* and a second shield piece 114*b* are attached to the first panel 112*a* on a side opposite the second panel 112*b*. A third shield piece 114*c* and a fourth shield piece 114*d* are attached to the second panel 112*b* on a side opposite the first panel 112*a*. The panels 112*a*, 112*b* may include a different number of shield pieces. For example, in some implementations, each of the panels 112*a*, 112*b* includes a single shield piece.

An opening 109 is formed in the second panel 112*b*. The opening 109 is positioned to align with an opening 906 (FIG. 8) (e.g., a cable routing opening) of the short stand 804 of the desktop phone device 702. The opening 109 may have a shape that is similar or congruent to a shape of a cable routing opening 906 of the short stand 804. A puck 110 is configured to be inserted through the opening 109 and the opening 906 of the short stand 804 to maintain the short stand 804 within the slot 111. In the illustrated example, the puck 110 includes a tab for easy manipulation. In the illustrated example, the puck 110 includes a tab 113. The tab 113 may be removable. In some implementations, the puck 110 does not include the tab 113. The puck includes levers 115*a*, 115*b* for manipulating latches integrated into a back portion of the puck 110.

A sleeve 106 is attached to the second piece 104*b* and forms a channel 108 between the second piece 104*b* and the sleeve 106. Cables from the desktop phone device 702 received in the receiving interface 112 may be routed through the channel 108 and through holes (not illustrated) in the first piece 104*a* and the second piece 104*b* to a location behind the tall stand 100. Accordingly, the sleeve 106 may hide such cables from sight.

Figure 3:
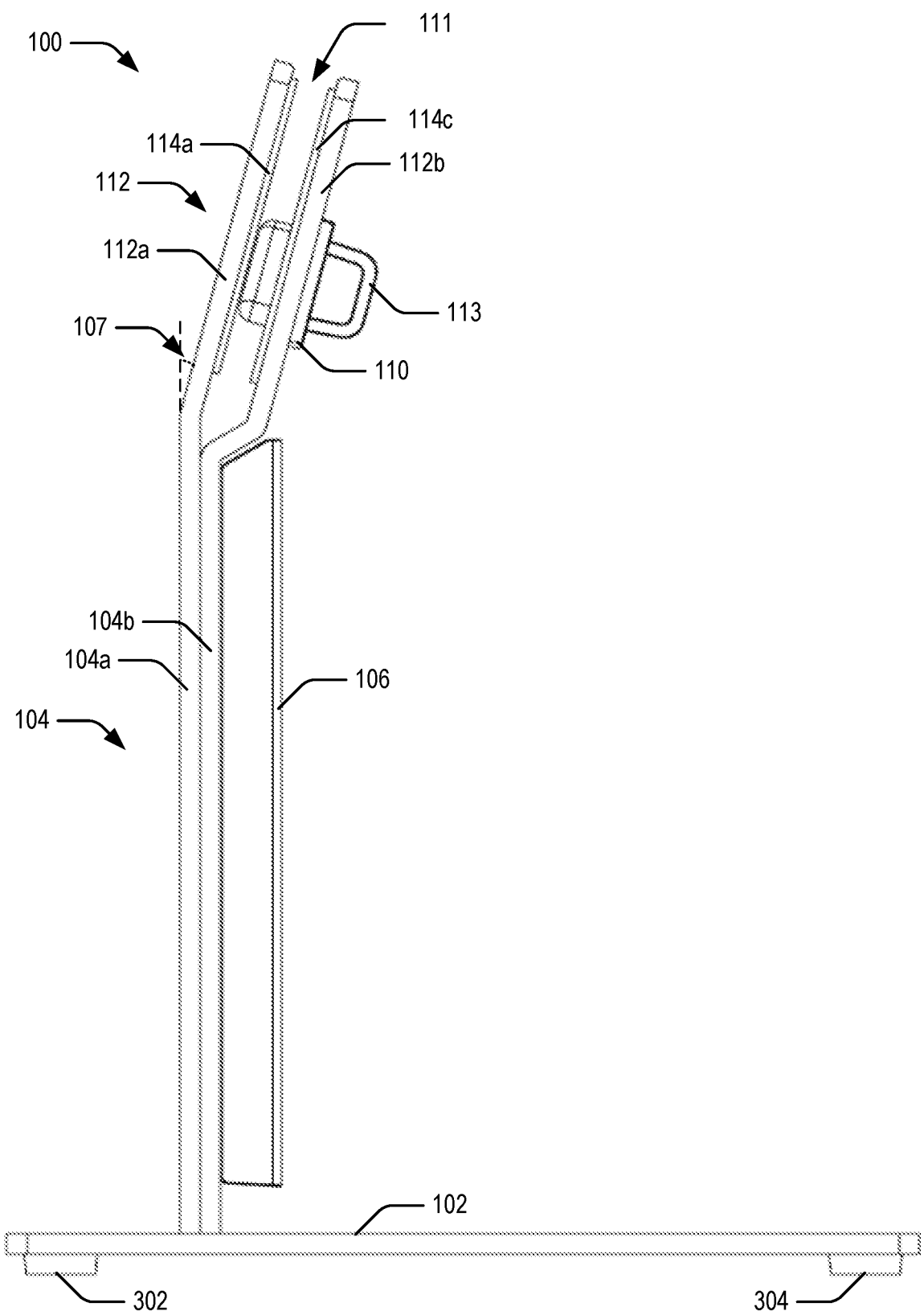
FIG. 3 illustrates a profile view of the tall stand.
Figure 4:
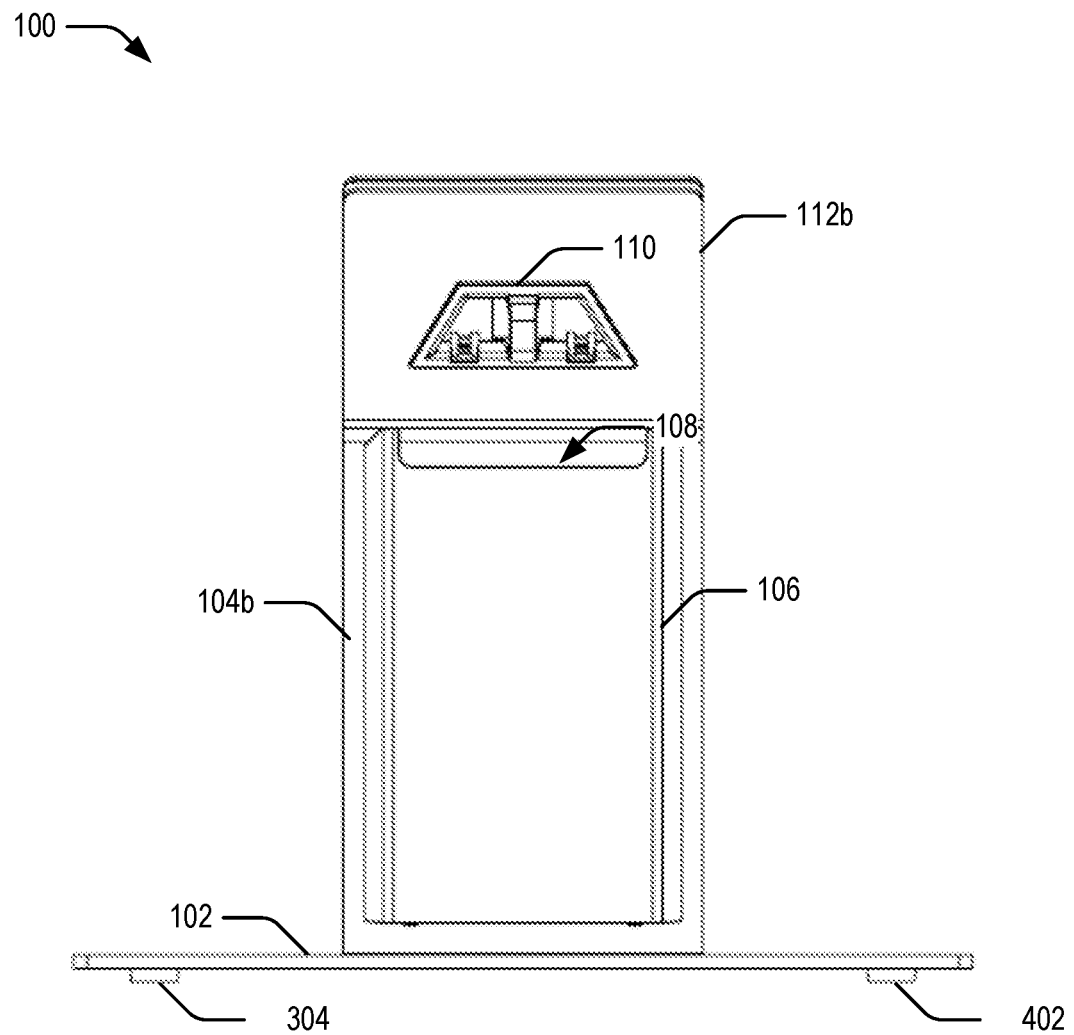
FIG. 4 illustrates a front view of the tall stand.
Figure 5:
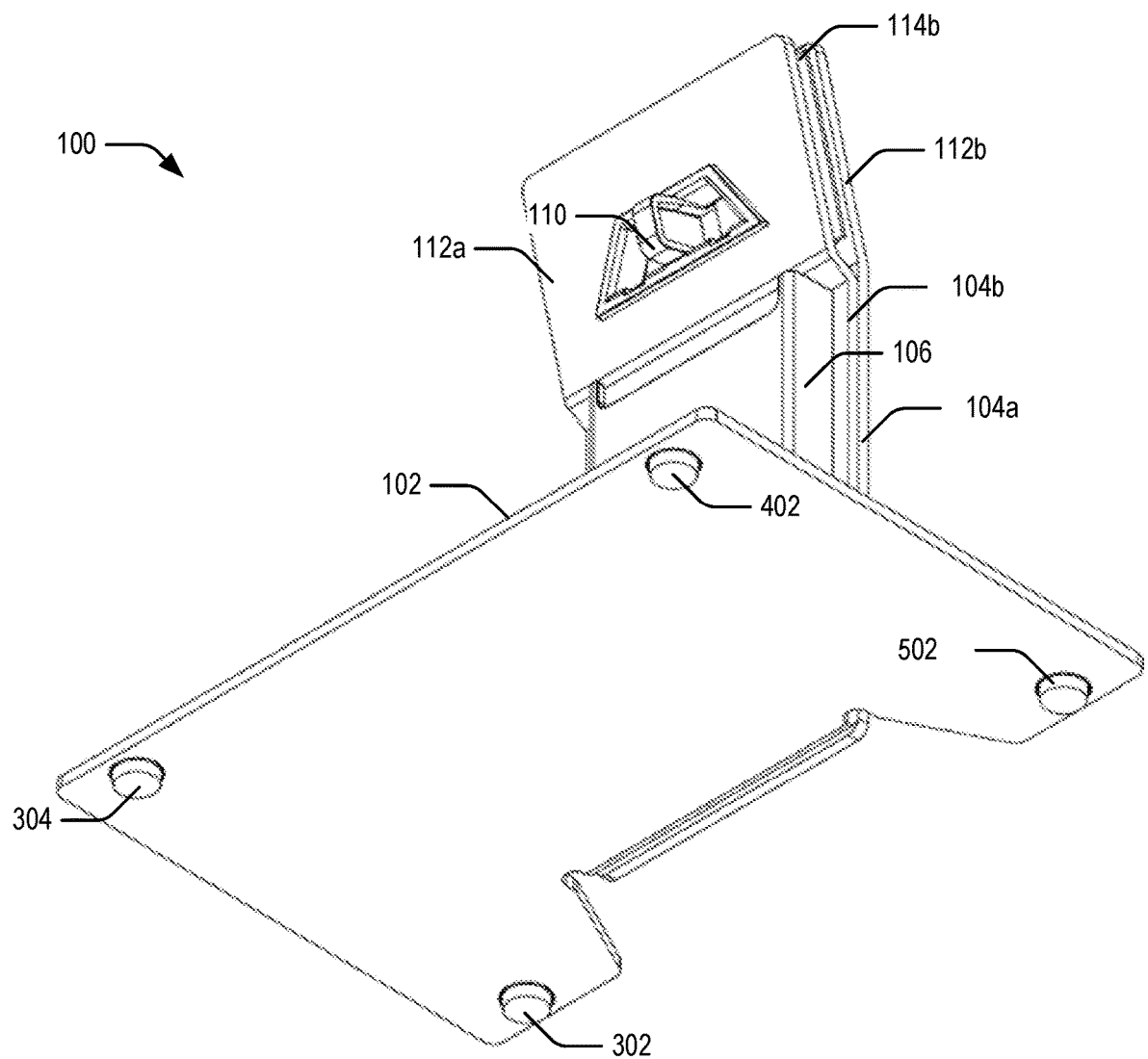
FIG. 5 illustrates a perspective view of the tall stand from below.

The tall stand 100 includes pads under the base 102. While FIG. 3 illustrates a first pad 302 and a second pad 304 attached to the base 102, other pads 402 and 502 may be attached to the base 102 to provide pads on all four corners of the base 102. Other arrangements of different numbers of pads are possible. Some implementations do not include pads. Such pads include rubber, plastic, another material, or a combination thereof and are configured to prevent the base 102 from contacting (and scratching) a surface (e.g., a desk) upon which the tall stand 100 is placed.

The tall stand 100 may be constructed in different configurations than those shown. In some such alternative examples, the neck 104 and the receiving interface 112 may be formed from discrete components coupled to each other. Further, the first piece 104a and the second piece 104b of the neck 104 correspond to a single component in some examples. In such examples, the neck 104 may be just one piece rather than two pieces. Similarly, the first panel 112a and the second panel 112b may be a single curved panel. Further, while the tall stand 100 is illustrated as a fixed height stand, the tall stand 100 has an adjustable height in other implementations. In some examples, the neck 104 includes a single piece and the receiving interface includes two separate panels (e.g., 112a, 112b) coupled to the single piece of the neck 104. Further, while depicted as planar, the neck 104 and the receiving interface 112 may have different shapes. To illustrate, the neck 104 may include one or more cylindrical rods and the receiving interface 112 may include a pin configured to be received within the rod to couple the neck 104 to the receiving interface 112. Alternatively, the rods may be configured to fit within a recess of the receiving interface 112.

In another design, the neck 104 is an arc rather planar, though the receiving interface may be generally planar to mate with a generally planar short stand 804. In yet another design, both the neck 104 and the receiving interface 112 are curved or in arc. This design is desirable if the short stand 804 is also curved or in an arc. In most designs the shape of the receiving interface 112 is complementary to the shape of the short stand 804 as the short stand 804 mates with the receiving interface 112.

Generally, the base 102 is planar as it is designed to rest on the top surface of a desk or work surface, which top is generally planar and also generally horizontal. If the tall stand 100 is to be used on a slanted surface, such as a drawing table, the neck 104 can be connected to the base 102 by a hinge to allow the neck 104 to be generally vertical even if the resting surface is not horizontal.

FIGS. 6 and 7 illustrate the desktop phone device 702 docked to the tall stand 100. The desktop phone device 702 has a main body 703 which includes a camera 704 and a screen 706. The desktop phone device 702 is configured to capture images of a local participant in a teleconference using the camera 704 and to display images of remote participants using the screen 706. Because the tall stand 100 elevates the desktop phone device 702 off a surface, the screen 706 is more easily viewed by the local participant (e.g., without looking down and straining). Similarly, the camera 704 generates images of that may better frame the local participant as compared to an implementation in which the desktop phone device 702 is located on a desk.

FIG. 7 depicts a side view of the tall stand 100 with the desktop phone device 702 docked. As shown, the desktop phone device 702 includes the short stand 804 attached to the desktop phone device 702 body by a friction hinge 802. The desktop phone device 702 may be placed on a surface propped up by the short stand 804. However, a local participant using the desktop phone device 702 may still need to gaze downward at the desktop phone device 702 when the desktop phone device 702 is placed directly on a surface and propped up by the short stand 804. Further, the camera 704 may be positioned such that images captured by the camera 704 frame the local participant's torso rather than the local participant's face. By docking the short stand 804 to the tall stand 100, the desktop phone device 702 is elevated such that the screen 706 is more convenient to view and the camera 704 is positioned to capture better framed images.

As shown, the short stand 804 fits into the slot 111 of the receiving interface 112 and the slot 111 is formed in a shape that is complementary to the short stand 804. The puck 110 is placed through the opening 109 in the second panel 112b and through an opening 906 in the short stand 804 (e.g., a cable routing opening) securing the desktop phone device 702 to the tall stand 100. The friction hinge 802 is configured to position the short stand 804 with respect to the desktop phone device 702 at angles greater than and less than the angle 107 of the receiving interface 112 with respect to the neck 104. Said another way, the angle 107 of the neck 104 with respect to the receiving interface 112 is a midpoint in a range of angles supported by the friction hinge 802. When the friction hinge 802 is positioned at an angle 803 that is equal to the angle 107, the screen 706 of the desktop phone device 702 is parallel to the neck 104. If the neck 104 is substantially vertical, the screen 706 of the desktop phone device 702 is then also substantially vertical. Because the angle 107 is within the range of motion of the friction hinge 802, the desktop phone device 702 may be angled (e.g., via articulation of the friction hinge 802) such that the screen 706 and camera 704 are parallel to the neck 104 (e.g., perpendicular to the base 102, generally vertical), at a negative angle with respect to the neck 104 (e.g., generally downwardly), or at a positive angle with respect to the neck 104 (e.g., generally upwardly). Thus, the angle between the neck 104 and the receiving interface 112 in conjunction with the friction hinge 802 provides a wide degree of configurability of desktop phone device 702 docked to the tall stand 100 for participants of many heights. In implementations in which the neck 104 is not perpendicular to the base 102, the receiving interface 112 is positioned at an angle "x" with respect to the base 102. X is not equal to 90 degrees and 90-$x$ is an intermediate angle in a range of angles supported by the friction hinge 802. Accordingly, when the friction hinge 802 is positioned at angle 90-$x$, the screen the screen 706 and the desktop phone device 702 will be perpendicular to the base 102 and the desktop phone device 702 may be angled upward and downward.

FIG. 8 illustrates a rear perspective view of the tall stand 100 and the desktop phone device 702. As depicted in FIG. 8, the short stand 804 of the desktop phone device 702 includes an opening 906. The opening 906 may be used for cable management. The opening 109 in the receiving interface 112 is similar or congruent to the opening 906 and the puck 110 is complementary to the opening 906. The opening 109 is positioned on the receiving interface 112 such that the opening 906 aligns with the opening 109 in response to insertion of the short stand 804 into the slot 111. Thus, the puck 110 may be inserted into the openings 109 and 906 to secure the short stand 804 within the slot 111. In the illustrated example, the puck 110 includes latches 904a, 904b. The latches 904a, 904b may be operable to secure the puck 110 to a wall of the first panel 112a. The latches 904a, 904b may be toggled by means of the levers 115a, 115b.

The neck 104 includes an opening 908. Cables of the desktop phone device 702 may be passed through the channel 108 and out the opening 908. Accordingly, the cables may be shielded from view by individuals in front of the tall stand 100.

In some implementations, the puck 110 is replaced by a different locking mechanism. For example, the short stand 804 and the receiving interface 112 may each include one or more openings configured to receive pins. Such pins may be configured to pass through the one or more openings when in a particular orientation but include projections that are too wide to pass through the openings when rotated from that particular orientation. Accordingly, the pins may be placed through the openings and rotated to secure the short stand 804 to the receiving interface 112. Further, in some implementations, the receiving interface 112 does not form the slot 111. For example, the receiving interface 112 may include a single panel to which the short stand 804 may be secured (e.g., with twisting locking pins). Other types of locking mechanisms may be used to secure the desktop phone device 702 to the tall stand in other implementations.

Thus, FIGS. 1-8 illustrate a tall stand configured to elevate a desktop phone device. Such a tall stand improves framing of images captured by a camera of the desktop phone device and increases usability of the desktop phone device by reducing a need for a user to bend his/her neck to look down at the desktop phone device.

The various embodiments described above are provided by way of illustration only and should not be construed so as to limit the scope of the disclosure. Various modifications and changes can be made to the principles and embodiments described herein without departing from the scope of the disclosure and without departing from the claims which follow. As an illustrative example, the friction hinge 802 can be replaced with a different type of hinge or bearing. Similarly, the camera 704 and the screen 706 may be arranged differently than is shown.

The invention claimed is:

1. A stand comprising:
    a neck;
    a base coupled to a first end of the neck; and
    a receiving interface located at a second end of the neck, wherein the receiving interface is configured to receive a short stand of a desktop phone device.

2. The stand of claim 1, wherein the receiving interface comprises a first panel and a second panel, the first panel and the second panel spaced to form a slot that is complementary to a shape of the short stand.

3. The stand of claim 2, further comprising;
    a first shield piece attached to a side of the first panel opposite the second panel; and
    a second shield piece attached to a side of the second panel opposite the first panel.

4. The stand of claim 2, wherein the second panel includes an opening configured to align with an opening in the short stand and to receive a puck for retaining the short stand in the receiving interface.

5. The stand of claim 2, further comprising a sleeve attached to the neck and configured to receive cables from the desktop phone device.

6. The stand of claim 2, wherein the neck is generally planar.

7. The stand of claim 2, wherein the neck is perpendicular with respect to the base.

8. An apparatus comprising:
    a desktop phone device including:
        a main body,
        a short stand; and
        a friction hinge coupling the short stand to the main body; and
    a tall stand including:
        a neck;
        a base coupled to a first end of the neck; and
        a receiving interface located at a second end of the neck, wherein the receiving interface is configured to receive the short stand.

9. The apparatus of claim 8, wherein the receiving interface is angled with respect to the neck.

10. The apparatus of claim 9, wherein the friction hinge is configured to move between angles greater than and less than the angle of the receiving interface with respect to the neck is within a range of angles.

11. The apparatus of claim 8, wherein the receiving interface comprises a first panel and a second panel, the first panel and the second panel spaced to form a slot that is complementary to a shape of the short stand.

12. The apparatus of claim 11, wherein the tall stand further comprises;
    a first shield piece attached to a side of the first panel opposite the second panel; and
    a second shield piece attached to a side of the second panel opposite the first panel.

13. The apparatus of claim 11, further comprising:
    a puck for retaining the short stand in the receiving interface,
    wherein the second panel includes an opening configured to align with an opening in the short stand and to receive the puck.

14. The apparatus of claim 13, wherein the opening in the short stand corresponds to a cable routing opening.

15. The apparatus of claim 13, wherein the puck includes a removable tab.

16. The apparatus of claim 13, wherein the puck includes latches configured to secure the puck to the receiving interface.

17. The apparatus of claim 11, wherein the tall stand further comprises a sleeve attached to the neck and configured to receive cables from the desktop phone device.

18. The apparatus of claim 8, wherein the neck is generally planar.

19. The apparatus of claim 8, wherein the tall stand further includes a sleeve coupled to the neck and configured to receive cables of the desktop phone device.

20. The apparatus of claim 8, wherein the neck is perpendicular with respect to the base.

* * * * *